April 28, 1942.  J. R. ODELL, JR  2,281,320
ROASTING GREEN COFFEE
Filed Oct. 2, 1939

Inventor
John R. Odell, Jr.
By Mason Fenwick & Lawrence
Attorneys

Patented Apr. 28, 1942

2,281,320

UNITED STATES PATENT OFFICE 2,281,320

ROASTING GREEN COFFEE

John R. Odell, Jr., Grosse Pointe Farms, Mich.

Application October 2, 1939, Serial No. 297,602

4 Claims. (Cl. 99—68)

This invention relates to improvements in the roasting of coffee and to an improved form of roasted coffee.

The roasting of coffee is largely empirical. Success depends on the skill of the operator. In roasting coffee, the green bean undergoes some changes that are not well understood but result in improvement of taste and aroma. Penetration of heat effects into the roasting coffee may be relatively slow. Hence, the exterior often becomes overparched while the interior remains relatively green. Thus problems are presented of obtaining even roasting throughout the coffee and also of avoiding scorching of the exterior of the roasted coffee. These problems have often been stated but proposed remedies yet leave much to be desired. Moreover, it is recognized that after coffee is roasted the product tends to deteriorate rapidly so as to lose flavor. Essential oils in the coffee become exposed to oxidizing influences and develop bitter or rancid tastes.

An object of this invention is to obtain a roasted coffee that is of substantial uniformity and of a nature that more nearly can be duplicated in different roasts. A further purpose is to roast coffee under less drastic conditions than heretofore have been necessary. Also, an important purpose of this invention is to roast coffee so as to improve its resistance to deterioration. An important purpose also is to obtain a roasted coffee that is mild but full flavored without development of bitter substances either during roasting or subsequently during storage.

Considerable utility in this invention is reflected in greater ease of control in roasting and greater certainty of producing a pleasantly flavored roasted product. Also, a useful feature of this invention is found in the ease with which this product is brewed into the coffee decoction as a beverage.

In the accompanying drawing are illustrated the coffee flakes involved in this invention.

In Figure 1 a flake of green coffee prepared according to this invention is illustrated in a magnified perspective view of the top of the flake;

Figure 1:
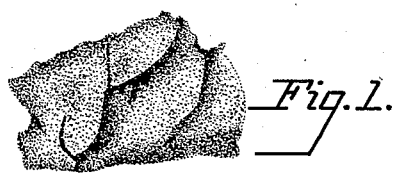

According to the general principles of this invention, the present improvements are effected by bringing green coffee into a flaked condition and roasting the green coffee flake in the absence of air. Preferably, green coffee flakes are roasted in an atmosphere largely of carbon dioxide.

For the purpose of illustration, reference is made to specific examples of the practice of this invention; however, without limitation to these examples inasmuch as this invention may be practiced otherwise within the limits of the appended claims.

Green coffee is brought to a moist condition so that its tissues flake readily. Then flaking is accomplished by suitable application of pressure such as by compression between rolls or between hammers. This step utilizes facilities that already are known of themselves for flaking various vegetable products. For example, flaking mills are used for treating products of corn, oats, soya, and the like. The green coffee flake is best compressed to a thickness of form about 0.020 to about 0.001 inch. Apparently at present the best range of thickness is about 0.007 to 0.010 inch. Within this range the cells of the coffee when green appear not to be ruptured unduly.

The flaked green coffee is roasted in such conventional apparatus as can be operated in an atmosphere of gas inert to the roasting flakes. Such atmosphere preferably is carbon dioxide but may consist also of other gases such as nitrogen, or of mixtures of inert gases. The purpose is to exclude oxidizing gases from contact with the green coffee flake during roasting.

Roasting temperatures may be somewhat lower than are currently utilized in commercial practice. However, the exact temperature necessarily depends on the condition or nature of the coffee. However, it is evident in practice that heat very quickly penetrates the green coffee flake to produce a product that is uniform throughout. Moreover, there appears to be an avoidance of dissipation of oil from the coffee cells. This is important because the essential oils thus are conserved in the finished product and are protected against oxidative influences. Moreover, this conservation of the aromatic quality within the roasted product is indicated further by the absence of scorched tissues. The roasted flake of this invention does not present the odor that is usually associated with roasted coffee though an exceedingly pleasant and characteristic coffee odor develops at once on application of hot water to the roasted flakes.

An example of preferred procedure will be illustrative of practice of this invention. Green coffee, to facilitate cracking or grinding, is dried to a moisture content of about 2 to 5%. The green bean then may be comminuted, for example between corrugated rolls such as are of themselves known in cracking cereals or in producing flour. The particles are substantially uniform and of a size to pass standard screen Nos. 18 to 24, or preferably about standard screen No. 20, as woven wire cloth screens fine series are designated by the U. S. Bureau of Standards. No. 20 screen, for example, presents a mesh opening of about 0.033 inch. These particles may then be humidified or even sprayed with water until their moisture content is about 25 to 45%, preferably about 35%, to facilitate flaking. However, the moisture content should be sufficiently low to avoid expression of liquid during flaking. These humidified particles then are flaked preferably between rolls. These flakes then may be roasted directly but preferably are dried somewhat in order to minimize the burden of moisture removal in the roasting drum itself. Roasting is effected in the non-oxidizing atmosphere described herein.

It is possible to form the flake directly from the whole green bean, but the resulting flake would be unduly large for most practical purposes. However, the green coffee bean absorbs from the atmosphere as much as about 30% moisture and so could be flaked directly. Or, the green coffee bean can be comminuted without drying as, for example with a hammer mill, but the particles would be exceedingly non-uniform in size. This would mean considerable loss as dust during subsequent treatment and also overroasting and resulting impairment of palatability.

This invention utilizes the absorptive properties of green coffee bean tissues for moisture and utilizes the plastic nature of the softened tissues of the green coffee bean. Also, this process avoids rupture to a considerable degree of the individual cells of the coffee bean. Moreover, it avoids the breaking up of the particles that is encountered when comminution of the coffee is attempted after roasting, inasmuch as roasted coffee tissues are relatively brittle. Breaking of a brittle roasted coffee tends to expose the roasted constituents, whether tissues or oils, to deleterious influences and tends to accelerate development of poor aroma or taste in the roasted coffee. Moreover, comminution of coffee after roasting results in considerable waste and in considerable lack of uniformity in the product. This is not only because of the difficulty of roasting separate particles, but because also of the considerable variation in particle sizes when coffee is broken up in some manner after roasting.

It is feasible to package the roasted green flakes of this invention in an atmosphere of inert gas as, for example, in a bag or can containing carbon dioxide and nitrogen or else to store the roasted product in vacuum. It may be observed further that the green bean flake roasted according to this invention permits the use of carbon dioxide atmospheres in storage without marked tendency to oxidation from the carbon dioxide. Evidently the tissues of the roasted flake of green coffee are seared but less altered injuriously than is the case with roasted whole coffee bean or even roasted ground coffee particles. The roasted green coffee flakes of this invention retain oily substances in the flake. In contrast, ground coffee and coffee that has been comminuted or shaped after roasting displays ruptured cells and dissipates oily substances. Thus not only are the flavor and aroma of this new roasted product of flaked green coffee pleasing, but the keeping qualities are superior.

Figure 2:
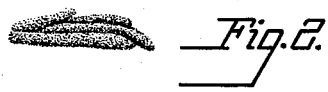
Figure 2 illustrates a similar flake magnified and viewed in side perspective.
Figure 3:
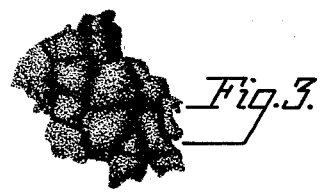
Figure 3 illustrates in magnified form a green coffee flake after roasting, viewed in perspective from the top of a flake.
Figure 4:
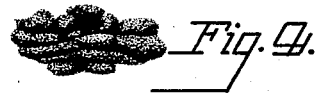
Figure 4 illustrates a magnified side perspective of a green coffee flake after roasting.

The coffee flakes involved in this invention are illustrated in Figures 1–4 inclusive. Figure 1 shows a magnified perspective view of the top of a green coffee flake and Figure 2 is a magnified perspective view of an edge of the flake. The particle appears as a group of overlying, oftentimes folded layers of cellular tissue of irregular contour. In comparison, Figures 3 and 4 show magnified views of a roasted flake. The roasted flake displays a generally puffed appearance with overlying layers but with noticeable fissures irregularly penetrating the particles. These appear in Figures 3 and 4 as darkened lines. Along the edges there appears some tendency for amalgamation between layers. The surface of the flake in roasting is darkened but the superficial tissues and the layers appear to be considerably expanded but seared or closed or filmed rather than ruptured or broken. The surfaces after roasting of the green coffee flake become partially curled and crinkled. Undoubtedly this is a result of stresses applied by drying and heating the moist but tough cellular tissues that have been compressed in the green coffee by flaking.

The product of this invention, which is roasted green coffee flake, extracts rapidly in the presence of hot water so that coffee beverage may be prepared quickly from this product. For example, a small amount of these flakes may be placed in a "coffee ball" or small porous bag. From this even in a cup of hot water a pleasing cup of coffee is extracted quickly. With other forms of roasted coffee, however, extraction is so slow that not only is an undue amount of time required, but extraction of undesirable flavoring components results so that the taste of such coffee is not nearly so acceptable as coffee extracted in this manner from the flakes of the present invention. Much of this result evidently is due to the moderate and uniform roasting that is feasible in roasting the green coffee flake.

In this illustrative description, reference has been made to flaking the green coffee bean or to flaking particles of the green coffee. It is intended, however, to include in this application broadly reducing the green bean or particles of green coffee to a thin layer before roasting. Purposes are to produce a relatively extensive surface area in relatively thin form regardless of the shape and regardless of the particular arrangement of cellular structure that may result, although as stated, in present preferred operations, the structure exhibits overlying layers in the thin flake.

Although I have described this invention in accordance with the patent statutes and have illustrated its principles by reference to a practice that is at present preferred, it will now be apparent to those skilled in this art that alterations and changes of detail are possible within the scope of the appended claims.

What I claim is:

1. A process of preparing a roasted coffee product comprising bringing the moisture content of green coffee bean sufficiently low to permit cracking the bean to form separate particles, then adding moisture to the particles to form a plastic composition, then flaking this plastic composition and roasting these green coffee flakes.

2. A process of preparing a roasted coffee product comprising bringing the moisture content of green coffee to about 35%, then flaking the green coffee and then roasting the green coffee flake.

3. A process of preparing roasted coffee comprising reducing the moisture content of the green coffee bean to about 2 to 5%, comminuting to substantially uniform particle size to be retained on about No. 18 standard mesh screen, then flaking the particles to about 0.02 to 0.001 inch thickness while maintaining the tissue cells substantially intact, then roasting the flakes.

4. A process of preparing roasted coffee comprising reducing the moisture content of green coffee bean to about 2 to 5%, then comminuting the bean with substantially uniform particles of about No. 20 standard mesh size, then moistening the particles to about 35% moisture, flaking the moist particles to about 0.01 inch thickness while maintaining the tissue cells substantially intact and roasting the flakes.

JOHN R. ODELL, Jr.